United States Patent
Saka et al.

(10) Patent No.: US 10,581,049 B2
(45) Date of Patent: Mar. 3, 2020

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hideyuki Saka, Toyota (JP); Tatsuya Hashimoto, Osaka (JP); Yusuke Fukumoto, Toyonaka (JP); Keisuke Ohara, Osaka (JP); Kouichi Toriyama, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 246 days.

(21) Appl. No.: 15/304,654

(22) PCT Filed: Apr. 15, 2015

(86) PCT No.: PCT/IB2015/000490
§ 371 (c)(1),
(2) Date: Oct. 17, 2016

(87) PCT Pub. No.: WO2015/159145
PCT Pub. Date: Oct. 22, 2015

(65) Prior Publication Data
US 2017/0047569 A1    Feb. 16, 2017

(30) Foreign Application Priority Data
Apr. 18, 2014    (JP) .................. 2014-086676

(51) Int. Cl.
*H01M 2/16*    (2006.01)
*H01M 10/0525*    (2010.01)
(Continued)

(52) U.S. Cl.
CPC ......... *H01M 2/1686* (2013.01); *H01M 2/166* (2013.01); *H01M 2/345* (2013.01);
(Continued)

(58) Field of Classification Search
CPC ............ H01M 10/05; H01M 10/0525; H01M 10/0587; H01M 10/4235; H01M 2/166; H01M 2/1686; H01M 2/345
See application file for complete search history.

(56) References Cited

U.S. PATENT DOCUMENTS 6,632,572 B1 * 10/2003 Takahashi ............... H01M 2/34
252/62.2
2006/0073345 A1    4/2006 Naruse
(Continued)

FOREIGN PATENT DOCUMENTS

CN    103378334 A    10/2013
JP    2012-195224 A    10/2012
(Continued)

OTHER PUBLICATIONS

Machine translation JP2012190622(A) (Year: 2012).*

*Primary Examiner* — Robert S Jones
*Assistant Examiner* — Victoria H Lynch
(74) *Attorney, Agent, or Firm* — Sughrue Mion, PLLC (57) ABSTRACT

A nonaqueous electrolyte secondary battery (100) includes a positive electrode (30), a negative electrode (40), a separator (50), a nonaqueous electrolytic solution, and a battery case (10). The positive electrode includes a positive electrode current collector (32) and a positive electrode active material layer (34). The separator includes a separator substrate (52) and a heat resistance layer (54). The separator substrate has an opposite surface opposite the positive electrode active material layer. The heat resistance layer constitutes at least a part of the opposite surface and contains a heat-resistant filler and a binder. The positive electrode active material layer has an adjacent region (X). The heat resistance layer has an opposite region (Y) opposite at least an end portion of the adjacent region. The end portion of the adjacent region is adjacent to a positive electrode current collector exposure
(Continued)

portion (33). The opposite region contains at least a calcium salt of carboxymethyl cellulose.

12 Claims, 3 Drawing Sheets

(51) Int. Cl.
    *H01M 10/05*     (2010.01)
    *H01M 2/34*     (2006.01)
    *H01M 10/0587*     (2010.01)
    *H01M 10/42*     (2006.01)

(52) U.S. Cl.
    CPC ....... *H01M 10/05* (2013.01); *H01M 10/0525* (2013.01); *H01M 10/0587* (2013.01); *H01M 10/4235* (2013.01)

(56) References Cited

U.S. PATENT DOCUMENTS

| | | | |
|---|---|---|---|
| 2009/0246612 A1* | 10/2009 | Naoi | .................... H01M 2/162 |
| | | | 429/144 |
| 2013/0273406 A1 | 10/2013 | Ihara et al. | |
| 2014/0287295 A1 | 9/2014 | Honda et al. | |
| 2015/0188183 A1 | 7/2015 | Nagai et al. | |

FOREIGN PATENT DOCUMENTS

| | | | | |
|---|---|---|---|---|
| JP | 2012190622 A | * | 10/2012 | ............. H01M 2/16 |
| JP | 2013-105521 A | | 5/2013 | |
| JP | 2013-115031 A | | 6/2013 | |
| JP | 2014-011070 A | | 1/2014 | |

* cited by examiner

NONAQUEOUS ELECTROLYTE SECONDARY BATTERY

BACKGROUND OF THE INVENTION

1. Field of the Invention

The present invention relates to a nonaqueous electrolyte secondary battery. More specifically, the invention relates to a nonaqueous electrolyte secondary battery in which a separator includes a heat resistance layer.

2. Description of Related Art

A nonaqueous electrolyte secondary battery such as a lithium ion battery or a nickel metal hydride battery is preferably used as a portable power supply or a vehicle-mounted power supply with high output because it is lightweight and has high energy density. Among these nonaqueous electrolyte secondary batteries, particularly, in a high-capacity secondary battery (for example, a vehicle-mounted battery) in which high-rate charging and discharging (rapid charging and discharging) is repeated, not only superior battery performance but also a high level of safety are required.

In a general configuration of this nonaqueous electrolyte secondary battery, a separator is provided between a positive electrode and a negative electrode to insulate both the electrodes. This separator is typically formed of a resin microporous sheet and can allow charge carriers to be held and move between the positive and negative electrodes. In addition, this separator has a shutdown function of blocking the movement of charge carriers when a battery is at a high temperature. In addition to the shutdown function, this separator is required to prevent the internal short-circuit of the positive and negative electrodes and to suppress a further increase in the temperature of the entire battery even when the separator is thermally shrunk or broken due to overheating during an abnormal situation.

As means for satisfying the above-described requirements, a separator that includes a porous heat resistance layer (HRL) on a surface of a resin porous sheet is disclosed (for example, refer to Japanese Patent Application Publication No. 2012-195224 (JP 2012-195224 A) and Patent Application Publication No. 2013-105521 (JP 2013-105521 A)). An HRL typically contains particles of an inorganic compound (inorganic filler) as a major component and has high heat resistance and insulating properties (non-conductivity). In addition, Japanese Patent Application Publication No. 2013-115031 (JP 2013-115031 A) discloses a water-soluble salt such as a lithium (Li) salt, a sodium (Na) salt, a potassium (K) salt, or an ammonium ($NH_3$) salt of carboxymethyl cellulose (CMC) that is contained as a thickener in a separator coating liquid for forming such an HRL.

However, in this type of nonaqueous electrolyte secondary battery, the capacity slowly decreases along with repeated charging-discharging cycles. A nonaqueous electrolyte secondary battery including the above-described HRL-provided separator has a problem in that the above tendency is significant, that is, cycle characteristics are poor.

SUMMARY OF THE INVENTION

As a result of intensive studies, the present inventors have made a conclusion that cycle characteristics of a nonaqueous electrolyte secondary battery deteriorate due to the following reasons. A positive electrode active material and a negative electrode active material expand and shrink along with the charging and discharging of a nonaqueous electrolyte secondary battery. An HRL included in a separator becomes insufficient along with the repeated expansion and shrinkage of the active materials and is slowly collapsed. As a result, the retention of a nonaqueous electrolytic solution decreases. In addition, the movement of charge carriers is prevented due to the blockage of the HRL. As a result, the cycle characteristics of the nonaqueous electrolyte secondary battery decrease.

Based on the above conclusion, the invention has been made to provide a nonaqueous electrolyte secondary battery in which battery performance such as cycle characteristics is further improved.

According to an aspect of the invention, there is provided a nonaqueous electrolyte secondary battery including: a positive electrode; a negative electrode; a separator; a nonaqueous electrolytic solution; and a battery case. The separator is arranged between the positive electrode and the negative electrode. The battery case accommodates the positive electrode, the negative electrode, the separator, and the nonaqueous electrolytic solution. The positive electrode includes a positive electrode current collector and a positive electrode active material layer. The positive electrode current collector has a positive electrode current collector exposure portion. The positive electrode current collector exposure portion is provided at an end portion of the positive electrode current collector. The positive electrode active material layer is formed on a portion of a surface of the positive electrode current collector other than the positive electrode current collector exposure portion. The separator includes a separator substrate and a heat resistance layer. The separator has an opposite surface opposite the positive electrode active material layer. The heat resistance layer constitutes at least a part of the opposite surface and contains a heat-resistant filler and a binder. The positive electrode active material layer has an adjacent region. The heat resistance layer has an opposite region opposite at least an end portion of the adjacent region, the end portion of the adjacent region being adjacent to the positive electrode current collector exposure portion. The opposite region contains at least a calcium salt of carboxymethyl cellulose.

In the nonaqueous electrolyte secondary battery according to the aspect of the invention, the above-described specific opposite region of the heat resistance layer (HRL) contains a calcium salt of carboxymethyl cellulose (hereinafter, referred to as "CMC-Ca") capable of forming a strong skeleton. With such a configuration, the collapsing of the HRL during charging and discharging is prevented, and battery characteristics represented by cycle characteristics are improved.

In a method of manufacturing a nonaqueous electrolyte secondary battery in the related art, a thickener is mixed with an active material layer or an HCL. As the thickener, generally, CMC is used. Typically, a CMC as the thickener is a readily-soluble Na salt or a Li salt. On the other hand, when a hardly-soluble additive is added to a battery component, a decrease in battery characteristics (for example, an increase in resistance) may occur, and thus, typically, the use thereof should be avoided. On the other hand, in the aspect of the invention, by adding a hardly-soluble CMC-CA to an appropriate portion, battery performance is improved while preventing a decrease in battery characteristics caused by an increase in resistance or the like.

In the aspect of the invention, the battery case may include a pressure-sensitive current interrupt device. The nonaqueous electrolytic solution may contain an overcharge additive that produces gas in an overcharge state of the nonaqueous electrolyte secondary battery.

In the nonaqueous electrolyte secondary battery, even when a predetermined amount of overcharge additive is added to the nonaqueous electrolytic solution, the amount of gas produced during overcharge decreases along with repeated charging and discharging. Therefore, during overcharge, a current interrupt device (hereinafter, referred to as "CID") may not operate normally. On the other hand, according to the aspect of the invention, a Ca component of the above-described CMC-Ca works suitably on the positive electrode and thus can promote a reaction of the overcharge additive on the surface of the positive electrode even after repeated charging and discharging. As a result, the amount of gas produced during overcharge is maintained to be high, and both battery performance and safety are superior.

According to the aspect of the invention, the opposite surface may include an opposite portion. An entire surface of the opposite portion is opposite to the positive electrode active material layer. In addition, the opposite region may occupy 1% or more to 50% or less of the opposite portion. The opposite region may occupy 2% or more of the opposite portion.

With the above-described configuration, battery performance and safety are more efficiently improved.

In the aspect of the invention, the opposite region may contain the calcium salt of carboxymethyl cellulose at a ratio of 0.25 parts by mass or more to 0.5 parts by mass or less with respect to 100 parts by mass of the heat-resistant filler.

With the above-described configuration, battery performance and safety are more efficiently improved.

In the aspect of the invention, the positive electrode, the negative electrode, and the separator may have an elongated shape and may constitute a wound electrode body.

In a secondary battery including a wound electrode body, the above-described problems such as the collapsing of the separator and the problem of overvoltage in the end portion of the positive electrode may become more severe. Accordingly, with the above-described configuration, the effects are more clearly exhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a preferred embodiment of the invention will be described with reference to the drawings. Matters (for example, a battery structure which is not a characteristic of the invention) necessary to practice this invention other than those (for example, a configuration of an HRL) specifically referred to in this description may be understood as design matters based on the conventional art in the pertinent field for a person of ordinary skills in the art. The invention can be practiced based on the contents disclosed in this description and common technical knowledge in the subject field. In each drawing described below, a dimensional relationship (for example, lengths, width, or thickness) does not necessarily reflect the actual dimensional relationship. In this specification, "nonaqueous electrolyte secondary batteries" refer to all the batteries which can be repeatedly charged and discharged by using an nonaqueous electrolytic solution as an electrolyte. Examples of "the nonaqueous electrolyte secondary batteries" include secondary batteries in which lithium ions (Li ions) or sodium ions (Na ions) are used as electrolyte ions (charge carriers), the batteries are charged and discharged by the movement of charges between positive and negative electrodes along with the Li ions or Na ions. Batteries which are generally called lithium ion batteries or lithium secondary batteries are typical examples included in the nonaqueous electrolyte secondary battery of this specification.

[Nonaqueous Electrolyte Secondary Battery]

Figure 1:
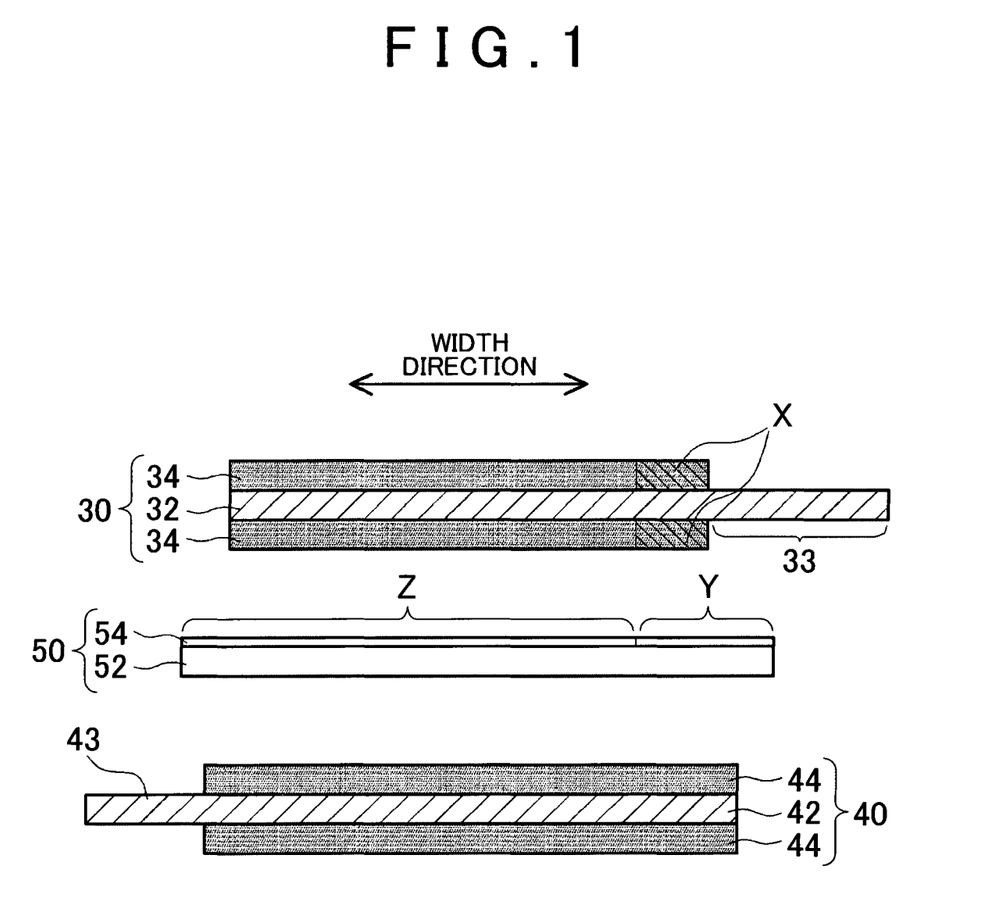
FIG. 1 is an exploded cross-sectional view schematically showing an electrode configuration of a nonaqueous electrolyte secondary battery according to an embodiment of the invention.
Figure 2:
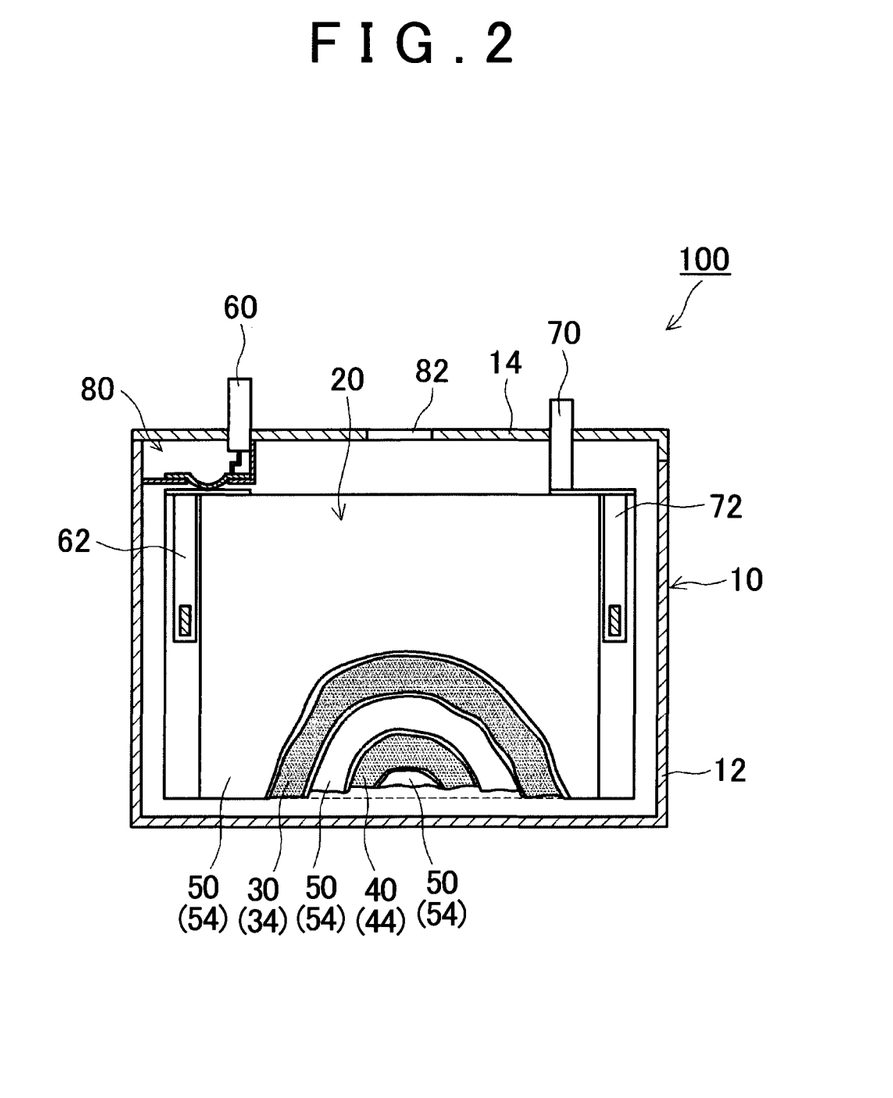
FIG. 2 is a cross-sectional view schematically showing a configuration of the nonaqueous electrolyte secondary battery according to the embodiment of the invention.
Figure 3:
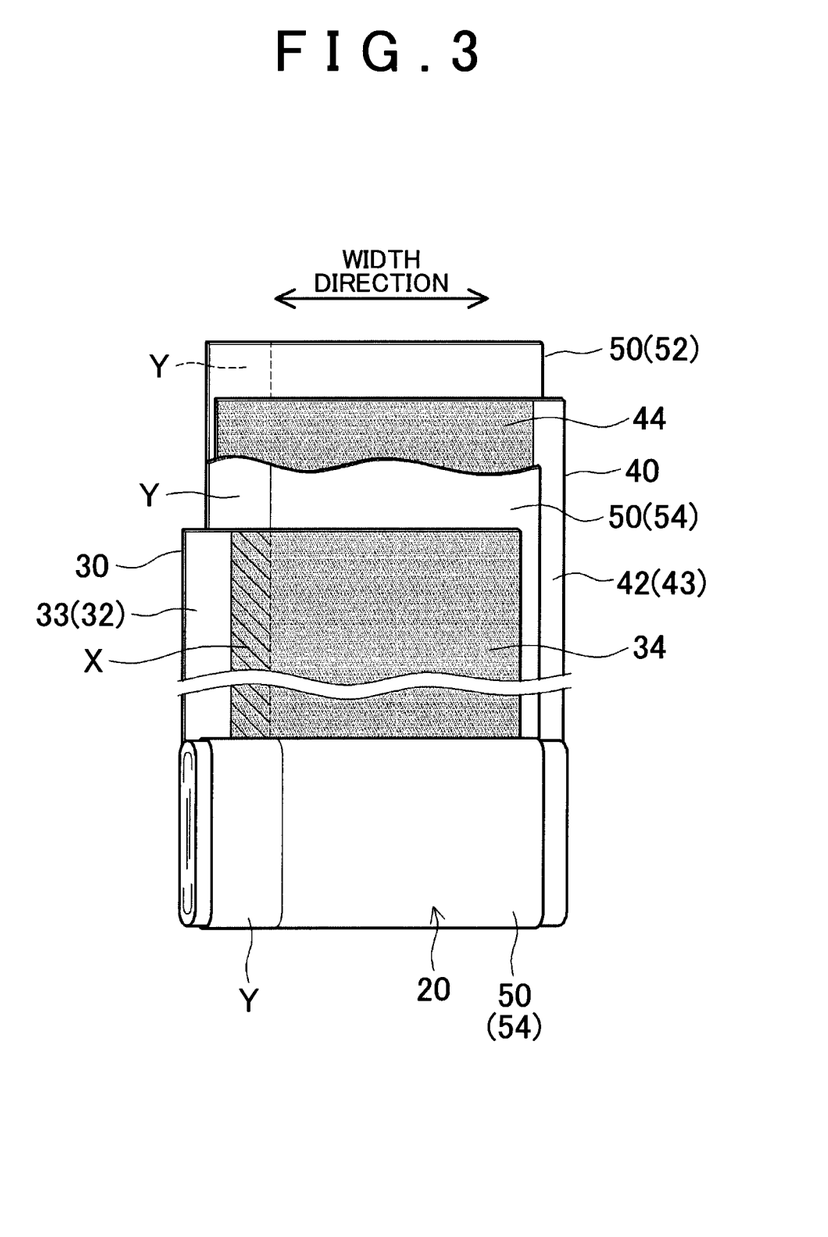
FIG. 3 is a schematic diagram showing a configuration of a wound electrode body.

FIG. 1 is an exploded cross-sectional view schematically showing an electrode configuration of a nonaqueous electrolyte secondary battery 100 according to an embodiment of the invention. That is, FIG. 1 is a schematic cross-sectional view showing configurations of a positive electrode 30, a negative electrode 40, and a separator 50 and the arrangement thereof. In addition, FIG. 2 is a cross-sectional view schematically showing a configuration of the nonaqueous electrolyte secondary battery 100 according to the embodiment of the invention. This nonaqueous electrolyte secondary battery 100 has a structure in which a battery case 10 accommodates the positive electrode 30, the negative electrode 40, the separator 50, and a nonaqueous electrolytic solution (not shown). FIG. 3 is a schematic diagram showing a configuration of a wound electrode body. Specifically, FIG. 3 is a diagram showing a state where the positive electrode 30, the negative electrode 40, and the separator 50 have an elongated shape and constitute a wound electrode body 20. Hereinafter, each component will be described using the lithium secondary battery 100 (hereinafter, also referred to simply as "secondary battery 100") according to a preferred embodiment of the invention as an example.

[Positive Electrode]

Typically, the positive electrode 30 includes a positive electrode current collector 32 and a positive electrode active material layer 34. In the positive electrode current collector 32, two portions are provided, the two portions including: a portion where the positive electrode active material layer 34 is formed; and a positive electrode current collector exposure portion 33 where the positive electrode current collector 32 is exposed without the positive electrode active material layer 34 being provided. This positive electrode current collector exposure portion 33 is provided at an end portion of the positive electrode current collector 32. The positive electrode active material layer 34 is provided on the portion of the surface of the positive electrode current collector 32 other than the positive electrode current collector exposure portion 33. In an example of FIG. 1, the positive electrode active material layer 34 is provided on both surfaces of the positive electrode current collector 32. However, the positive electrode active material layer 34 may be provided on either one of the surfaces.

This positive electrode active material layer 34 contains a positive electrode active material. Typically, the positive electrode active material layer 34 may be bonded to the positive electrode current collector 32 in a state where particles of the positive electrode active material and a conductive material bind to each other through a binder. Such a positive electrode 30 can be manufactured, for example, by supplying a positive electrode paste to the portion of the surface of the positive electrode current collector 32 other than the positive electrode current collector exposure portion 33 and then drying the positive electrode paste to remove a solvent. The positive electrode paste is obtained by dispersing the positive electrode active material, the conductive material, and the binder in an appropriate solvent, and examples thereof include a slurry and an ink. As the positive electrode current collector 32, a conductive member formed of highly conductive metal (for example, aluminum, nickel, titanium, or stainless steel) can be preferably used.

As the positive electrode active material, a lithium-containing compound containing lithium and one kind or two or more kinds of transition metal elements can be preferably used, in which the lithium-containing compound is a material capable of storing and releasing lithium ions. For example, the lithium-containing compound may be lithium transition metal composite oxide. Preferable example of the positive electrode active material include lithium transition metal oxides having a layered rock-salt type or spinel-type crystal structure. Examples of the lithium transition metal oxides include lithium nickel composite oxide (for example, $LiNiO_2$), lithium cobalt composite oxide (for example, $LiCoO_2$), lithium manganese composite oxide (for example, $LiMn_2O_4$), and a ternary lithium-containing composite oxide. Examples of the ternary lithium-containing composite oxide include lithium nickel cobalt manganese composite oxide (for example, $LiNi_{1/3}Co_{1/3}Mn_{1/3}O_2$). In addition, as the positive electrode active material, a polyanion-based compound (for example, $LiFePO_4$, $LiMnPO_4$, $LiFeVO_4$, $LiMnVO_4$, $Li_2FeSiO_4$, $Li_2MnSiO_4$, or $Li_2CoSiO_4$) represented by a formula of $LiMPO_4$, $LIMVO_4$, or $Li_2MSiO_4$ (wherein M represents at least one element selected from among Co, Ni, Mn, and Fe) may be used.

The conductive material is not particularly limited to a specific conductive material as long as it is used in a lithium ion secondary battery of the related art. For example, a carbon material such as carbon powder or carbon fiber can be used. As the carbon powder, for example, carbon powders of various carbon blacks (for example, acetylene black, furnace black, and Ketjen black) and graphite powder can be used. Among these, powder of acetylene black (AB) is preferably used as the carbon powder. Among these conductive materials, one kind can be used alone, or two or more kinds can be appropriately used in combination.

As the binder, binders which are used in a positive electrode of a common lithium ion secondary battery can be appropriately adopted. For example, when the positive electrode active material layer 34 is formed by supplying a paste, a polymer which can be uniformly dissolved or dispersed in a solvent constituting the paste can be used as the binder. When a nonaqueous (solvent-based) paste is used, a polymer material which can be dissolved in an organic solvent, for example, a vinyl halide resin such as polyvinylidene fluoride (PVDF) or a polyvinylidene chloride (PVDC), or a polyalkylene oxide such as polyethylene oxide (PEO) can be used. In addition, when an aqueous paste (paste which can be diluted with water) is used, a water-soluble polymer material or a water-dispersible (which can be dispersed in water) polymer material can be preferably adopted. Examples of the water-soluble or water-dispersible polymer include polytetrafluoroethylene (PTFE), carboxymethyl cellulose (CMC), and styrene-butadiene rubber (SBR). The above-described exemplary polymer materials may be used not only as the binder but also as a thickener of the above-described paste or other additives.

As the solvent for dissolving the constituent materials of the above-described positive electrode active material layer 34, any one of an aqueous solvent and a nonaqueous solvent (organic solvent) can be used as long as it has properties corresponding to the properties of the binder used. For example, as the aqueous solvent, water or a mixed solvent containing water as a major component can be used. As a solvent constituting the mixed solvent other than water, one kind or two or more kinds of organic solvents (for example, lower alcohols or lower ketones) which can be uniformly mixed with water can be used. As the nonaqueous solvent, for example, N-methyl-2-pyrrolidone (NMP) can be preferably used.

A ratio of the mass of the positive electrode active material to the total mass of the positive electrode active material layer 34 is suitably about 60 mass % or more (typically, 60 mass % to 99 mass %) and is usually preferably about 70 mass % to 95 mass %. When the binder is used, a ratio of the mass of the binder to the total mass of the positive electrode active material layer is, for example, about 0.5 mass % to 10 mass % and is usually preferably about 1 mass % to 5 mass %. When the conductive material is used, a ratio of the mass of the conductive material to the total mass of the positive electrode active material layer is, for example, about 1 mass % to 20 mass % and is usually preferably about 2 mass % to 10 mass %. In addition, the thickness of the positive electrode active material layer 34 is, for example, 20 µm or more and typically 50 µm or more and is, for example, 200 µm or less and typically 100 µm or less. In addition, the density of the positive electrode active material layer 34 is not particularly limited, but is, for example, 1.5 g/cm$^3$ or more and typically 2 g/cm$^3$ or more and is, for example, 4.5 g/cm$^3$ or less and typically 4.2 g/cm$^3$ or less. The positive electrode active material layer satisfying the above-described range can realize high battery performance (for example, high energy density and output density).

[Negative Electrode]

Typically, the negative electrode 40 includes a negative electrode current collector 42 and a negative electrode active material layer 44. In the negative electrode current collector 42, two portions are provided, the two portions including: a portion where the negative electrode active material layer 44 is formed; and a negative electrode current collector exposure portion 43 where the negative electrode current collector 42 is exposed without the negative electrode active material layer 44 being provided. This negative electrode current collector exposure portion 43 is provided at an end portion of the negative electrode current collector 42. The negative electrode active material layer 44 is provided on the portion of the surface of the negative electrode current collector 42 other than the negative electrode current collector exposure portion 43.

This negative electrode active material layer 44 contains a negative electrode active material. Typically, the negative electrode active material layer 44 may be bonded to the negative electrode current collector 42 in a state where particles of the negative electrode active material bind to each other through a binder. Such a negative electrode 40 can be manufactured, for example, by dispersing the negative electrode active material and the binder in an appropriate solvent (for example, water or N-methyl-2-pyrrolidone, preferably water) to obtain a negative electrode paste, supplying the negative electrode paste to the surface of the negative electrode current collector 42, and then drying the negative electrode paste to remove the solvent. As the negative electrode current collector 42, a conductive member formed of highly conductive metal (for example, copper, nickel, titanium, or stainless steel) can be preferably used.

The negative electrode active material is not particularly limited, and various known materials which can be used as a negative electrode active material of a nonaqueous electrolyte secondary battery may be used. Among these various materials, one kind may be used alone, or two or more kinds may be used in combination (as a mixture or a composite). Preferable examples of the negative electrode active material include various carbon materials such as graphite, non-graphitizable carbon (hard carbon), graphitizable carbon (soft carbon), carbon nanotube, and a carbon material having a combination thereof. Among these, a graphite-based material such as natural graphite (plumbago) or artificial graphite is preferably used from the viewpoint of energy density. It is preferable that amorphous carbon is arranged on at least a portion of a surface of the graphite-based material. It is more preferable that amorphous carbon is arranged on substantially the entire region of a surface of granular carbon. In the amorphous carbon, a large area of an edge surface is exposed on the surface thereof, and the acceptability of charge carriers is high (that is, the storing and releasing rate of charge carriers is high). In addition, graphite has high theoretical capacity and energy density. Accordingly, by using amorphous carbon-coated graphite as the negative electrode active material, a nonaqueous electrolyte secondary battery having high capacity, high energy density, and superior input and output characteristics can be realized. In addition to the carbon material, for example, lithium titanium composite oxide such as $Li_4Ti_5O_{12}$ or lithium transition metal composite nitride may also be used.

As the binder, binders which are used in a negative electrode of a common lithium ion secondary battery can be appropriately adopted. For example, the same binders as those described in the positive electrode 30 can be used. When the aqueous solvent is used to form the negative electrode active material layer 44, a rubber, a water-soluble polymer material, or a water-dispersible polymer material can be preferably used. Examples of the rubber include styrene-butadiene rubber (SBR). In addition, examples of the water-soluble polymer material, or the water-dispersible polymer material include polyethylene oxide (PEO) and a vinyl acetate copolymer. SBR is more preferably used. The above-described exemplary polymer materials may be used not only as the binder but also as a thickener of the above-described paste or other additives. As a dispersion medium of the negative electrode active material, an aqueous solvent can be preferably used.

In addition, depending on the method of forming the negative electrode active material layer 44, a thickener may be added. As the thickener, the same binders as described above may be used. For example, the following water-soluble or water-dispersible polymer may be adopted. Examples of the water-soluble polymer include cellulose polymers such as methyl cellulose (MC), carboxymethyl cellulose (CMC), cellulose acetate phthalate (CAP), and hydroxypropyl methylcellulose (HPMC); and polyvinyl alcohol (PVA).

A ratio of the mass of the negative electrode active material to the total mass of the negative electrode active material layer is suitably about 50 mass % or more and is usually preferably about 90 mass % to 99 mass % (for example, 95 mass % to 99 mass %). As a result, high energy density can be realized. When the binder is used, a ratio of the mass of the binder to the total mass of the negative electrode active material layer is, for example, about 1 mass % to 10 mass % and is usually preferably about 1 mass % to 5 mass %. As a result, the mechanical strength (shape retaining ability) of the negative electrode active material layer can be suitably secured, and superior durability can be realized. When the thickener is used, a ratio of the mass of the thickener to the total mass of the negative electrode active material layer is, for example, about 1 mass % to 10 mass % and is usually preferably about 1 mass % to 5 mass %. By appropriately pressing the negative electrode, the thickness and density of the negative electrode active material layer can be adjusted. In addition, the thickness of the negative electrode active material layer after being pressed is, for example, 20 µm or more and typically 50 µm or more and is, for example, 200 µm or less and typically 100 µm or less. In addition, the density of the negative electrode active material layer is not particularly limited, but is, for example, 0.8 g/cm³ or more and typically 1.0 g/cm³ or more and is, for example, 1.6 g/cm³ or less and typically 1.5 g/cm³ or less (for example, 1.4 g/cm³ or less).

[Capacity Ratio of Negative Electrode to Positive Electrode]

A capacity ratio of the negative electrode 40 to the positive electrode 30 can be adjusted using a difference in the acceptability of charge carriers and the like. Specifically, a ratio ($C_a/C_c$) of a negative electrode capacity $C_a$ (mAh) to a positive electrode capacity $C_c$ (mAh) is suitably 1.0 to 2.0 and preferably 1.5 to 1.9 (for example, 1.7 to 1.9). Here, the positive electrode capacity $C_c$ (mAh) is defined as a product of the theoretical capacity (mAh/g) of the positive electrode active material per unit mass and the mass (g) of the positive electrode active material. In addition, the negative electrode capacity $C_a$ (mAh) is defined as a product of the theoretical capacity (mAh/g) of the negative electrode active material per unit mass and the mass (g) of the negative electrode active material. By adjusting the capacity ratio of the positive and negative electrodes opposite to each other, battery characteristics such as battery capacity and energy density can be maintained to be superior, a charge balance between the positive and negative electrodes can be kept as a whole.

[Separator]

The separator 50 is a constituent material that insulates the positive electrode 30 and the negative electrode 40 and can allow the permeation of charge carriers. Typically, the separator 50 is arranged between the positive electrode active material layer 34 and the negative electrode active material layer 44. The separator 50 includes a separator substrate 52 and an HRL 54. The HRL 54 may be provided on a single surface or both surfaces of the separator substrate 52. In the secondary battery 100 according to the embodiment of the invention, when being provided on a single surface of the separator substrate 52, the HRL 54 is provided on at least a surface of the separator substrate 52 opposite to the positive electrode active material layer 34.

[Separator Substrate]

The separator substrate 52 is configured to have a holding function and a shutdown function of the nonaqueous electrolyte. As the separator substrate 52, a microporous resin sheet formed of a resin such as polyethylene (PE), polypropylene (PP), polyester, cellulose, or polyamide can be preferably used. Among these, a microporous sheet formed of a polyolefin resin such as PE or PP is preferably used because it can set a shutdown temperature to be in a preferable range of 80° C. to 140° C. (typically 110° C. to 140° C.; for example, 120° C. to 135° C.). The separator substrate 52 may have a single-layer structure of a sheet-shaped resin material alone; or a structure in which two or more sheet-shaped resin materials having different materials and properties (for example, average thickness or porosity) are laminated (for example, a three-layer structure in which a PP layer is laminated on both surfaces of a PE layer).

The average thickness of the separator substrate 52 is not particularly limited, but is usually 10 μm or more and typically 15 μm or more (for example, 17 μm or more). In addition, the upper limit is usually 40 μm or less and typically 30 μm or less (for example, 25 μm or less). By adjusting the average thickness of the separator substrate to be within the above-described range, the permeability of charge carriers can be maintained to be superior, and small short-circuit (leakage current) is not likely to occur. Therefore, input and output densities and safety can be simultaneously realized at a high level.

[HRL]

The HRL 54 is a porous insulating layer having heat resistance. The essential structure and material of the HRL 54 are not particularly limited as long as the following requirements are satisfied: the HRL 54 has heat resistance at a shutdown temperature (typically, 80° C. to 140° C.) at which an electrochemical reaction of a battery is stopped when the battery generates heat; and the HRL 54 has a porous structure that can secure the permeability of charge carriers. For example, the HRL 54 can be formed of a material having heat resistance so as not to be softened and melted at a temperature of 150° C. or higher (typically 200° C. or higher) and to maintain a porous structure. Specifically, the HRL 54 can be formed of a resin material, an inorganic material, a glass material, or a composite material thereof having the above-described heat resistance and insulating properties.

The HRL 54 according to the embodiment of the invention contains a heat-resistant filler and a binder. More specifically, the HRL 54 is bonded to the separator substrate 52 in a state where particles of the heat-resistant filler bind to each other through the binder. In the embodiment of the invention, a predetermined opposite region Y of the HRL 54 contains at least CMC-Ca. Here, the predetermined opposite region Y of the HCL 54 includes a region (portion) of the HCL 54 opposite to a region X of the positive electrode active material layer 34, the region X being adjacent to the positive electrode current collector exposure portion 33. The region X may be considered the adjacent region according to the invention. In addition, the opposite region Y will also be referred to simply as "region Y". In general, the separator 50 is formed to be wider than the positive electrode active material layer 34. This wide portion may or may not contain CMC-Ca. Here, the wide portion may be considered a portion of the separator that is not opposite to the positive electrode active material layer 34. From the viewpoint of structural simplicity, it is preferable that the wide portion contains CMC-Ca. That is, as shown in FIG. 1, the opposite region Y may include, for example, a portion (region) of the HRL 54 opposite to the region X of the positive electrode active material layer 34; and a portion of the HRL 54 positioned on an end portion side relative to the above portion of the opposite region Y (in other words, a wide portion of the HRL 54 being not opposite to the positive electrode active material layer 34).

For example, in an example of FIGS. 1 and 3, the positive electrode current collector exposure portion 33 is provided in an end portion (in FIG. 3, a left end portion) of the elongated positive electrode current collector 32 along the longitudinal direction. The positive electrode active material layer 34 is provided in the other region of the positive electrode current collector 32. Here, as described above, in order for the negative electrode 40 to reliably accept charge carriers released from the positive electrode 30 during charging, the negative electrode capacity $C_a$ may be set to be higher than the positive electrode capacity $C_c$. This configuration is realized by designing the dimension (typically, width) of the negative electrode active material layer 44 to be larger than that of the positive electrode active material layer 34. For example, the width of the negative electrode active material layer 44 is wider than the width of the positive electrode active material layer 34, and the width of the separator 50 is wider than the width of the negative electrode active material layer 44. The negative electrode active material layer 44 is arranged so as to cover the positive electrode active material layer 34 in the width direction. In addition, the separator 50 is arranged so as to cover the negative electrode active material layer 44 and the positive electrode active material layer 34 in the width direction.

According to this configuration, the area of a portion of the negative electrode active material layer 44 facing an end portion of the positive electrode active material layer 34 in the width direction is larger than the area of a portion of the negative electrode active material layer 44 facing the other portion of the positive electrode active material layer 34. Therefore, in the end portion of the positive electrode active material layer 34 in the width direction, the acceptance capacity of charge carriers is locally high. Accordingly, the end portion of the positive electrode active material layer 34 is likely to have a locally higher potential than, for example, the center portion thereof. In addition, in an end portion (for example, the region X) of the positive electrode active material layer 34 adjacent to the positive electrode current collector exposure portion 33, the free movement of charge carriers released from the positive electrode active material layer 34 is blocked by the positive electrode current collector exposure portion 33. For example, the charge carriers cannot move to a back surface side beyond the positive electrode current collector 32 (positive electrode current collector exposure portion 33). Therefore, in the end portion of the positive electrode active material layer 34 in the width direction, an end portion (region X) adjacent to the positive electrode current collector exposure portion 33 is likely to have a higher potential than the other end portions. In the embodiment of the invention, the opposite region Y of the HRL 54 contains CMC-Ca, the opposite region Y being opposite to the region X which is likely to have the highest potential in the positive electrode active material layer 34.

Here, CMC-Ca is a hardly-soluble salt and has a stronger skeleton than a water-soluble sodium salt of CMC (hereinafter, also referred to as "CMC-Na). By the region Y of the HRL 54 containing CMC-Ca, the mechanical strength of the region Y increases to be higher than that of the other regions. As a result, even when the positive electrode 30 and the negative electrode 40 expand and shrink repeatedly along with charging and discharging, the collapsing of the region Y of the HRL 54 is prevented. In addition, the region Y of the HRL 54 functions as a support which prevents the collapsing of the entire region of the HRL 54. In other words, the collapsing of the entire region of the HRL 54 is prevented, and thus the porosity thereof is maintained to be high. The collapsing of the HRL 54 is also prevented against an external force which is generated, for example, when the single secondary battery 100 is used or when the plural secondary batteries 100 are bound.

Accordingly, according to the embodiment of the invention, a decrease in the performance of the secondary battery 100 due to the collapsing of the HRL of the HRL-provided separator is prevented. Specifically, for example, even after charging-discharging cycles, the retention of the nonaqueous electrolytic solution not only in the region Y of the HRL 54 but also in the entire region of the HRL 54 is maintained to be high. As a result, the movement of charge carriers between the positive and negative electrodes is smooth, and an increase in battery resistance due to the collapsing of the HRL 54 is prevented. In other words, charging-discharging characteristics are improved. In addition, since the collapsing of the region Y which is the end portion of the HRL 54 is prevented, the nonaqueous electrolytic solution pushed out from the HRL 54 can return to the center portion of the HRL 54. With the above-described configuration, for example, high-rate charging and discharging can be suitably performed. Since this effect can be maintained even after repeated charging and discharging, the cycle characteristics (typically, a capacity retention under various conditions) of the secondary battery 100 disclosed herein are improved.

In addition, as described above, the region X of the positive electrode active material layer 34 is likely to have a locally high potential (overvoltage) even during normal charging and discharging (during a normal situation). In this state, when the battery is in an overcharge state, a reaction between the positive electrode 30 and an overcharge additive can be prevented. On the other hand, according to the embodiment of the invention, the opposite region Y of the HRL 54 contains CMC-Ca. Here, a Ca component contained in CMC-Ca can promote the reaction of the overcharge additive in the overcharge state. As a result, even in the secondary battery 100 having the above-described configuration, the reaction between the positive electrode 30 and the overcharge additive is promoted during overcharge, and a sufficient amount of gas for operating a CID 80 can be rapidly produced.

The details of the mechanism of the Ca component promoting the reaction of the overcharge additive are not clear but are presumed to be as follows. That is, in a local overvoltage portion of the positive electrode active material layer 34, even during a normal situation of the battery, the overcharge additive contained in the nonaqueous electrolytic solution is decomposed, and a polymer film can be formed on the surface of the positive electrode active material layer 34 (typically, the positive electrode active material). On the other hand, charge carriers present on the surface of the positive electrode active material layer 34 (typically, the positive electrode active material), for example, lithium (Li) is usually present in the form of LiOH and is alkaline on the surface of the positive electrode active material layer 34 in the nonaqueous electrolytic solution. On the other hand, in the embodiment of the invention, the Ca component is supplied to the surface of the positive electrode active material layer 34 from the HRL 54 opposite to the positive electrode active material layer 34. Li forms a compound (for example, LiCaO) with the Ca component, and this compound is not alkaline. By adjusting the surface properties of the positive electrode active material layer 34 as described above, the decomposition of the overcharge additive and the formation of the polymer film on the positive electrode surface during a normal use are prevented, and the reaction of the overcharge additive during overcharge is promoted.

It is preferable that the opposite region Y is set in the HRL 54 so as to be opposite to a region (hereinafter, this region will be referred to as "opposite region 50%") which occupies 50% or less of the positive electrode active material layer 34 from the end portion adjacent to the positive electrode current collector exposure portion 33 in the width direction. In general, the separator 50 is formed to be wider than the positive electrode active material layer 34, and this wide portion may or may not contain CMC-Ca. From the viewpoint of formation simplicity, it is preferable that the wide portion contains CMC-Ca. When the opposite region Y is set so as to be opposite to a region wider than the opposite region 50%, a decrease in battery performance due to the collapsing of the HRL is prevented, but the resistance of the region Y may increase due to CMC-Ca, which is not preferable. The region Y is set so as to be opposite to a region which is preferably the opposite region 40% or narrower and more preferably the opposite region 30% or narrower. In addition, as long as even a small opposite region (wider than the opposite region 0%) is formed, the region Y can exhibit the above-described effects. However, in order to more suitably prevent the collapsing of the HRL 54, for example, the region Y is set so as to be opposite to a region which is preferably the opposite region 1% or wider, more preferably the opposite region 2% or wider, and still more preferably the opposite region 5% or wider (for example, the opposite region 10% or wider).

In addition, as long as the region Y contains even an extremely small amount of CMC-Ca, the above-described effects can be exhibited. However, in order to more efficiently prevent the collapsing of the HRL 54, the region Y contains CMC-Ca at a ratio of preferably 0.1 parts by mass or more, more preferably 0.2 parts by mass or more, and still more preferably 0.25 parts by mass or more (for example, 0.3 parts by mass or more) with respect to 100 parts by mass of the heat-resistant filler. In addition, it is not preferable that the ratio of the CMC-Ca is excessively high because the resistance of the region Y increases, and the dispersibility of CMC-Ca may be poor. From this point of view, the region Y contains CMC-Ca at a ratio of preferably 0.6 parts by mass or less, more preferably 0.5 parts by mass or less, and still more preferably 0.45 parts by mass or less (for example, 0.4 parts by mass or less) with respect to 100 parts by mass of the heat-resistant filler.

This CMC-Ca functions as a thickener or a binder as in the case of CMC-Na or the like. Accordingly, CMC-Ca may be added to the opposite region Y of the HRL 54, for example, as a thickener or a binder (preferably as a thickener). In this case, CMC-Ca may be used instead of some of the polymer components which are used as a binder, a thickener, and the like in the related art.

Typical examples of the heat-resistant filler include particulate or fibrous materials, for example, inorganic oxides such as alumina ($Al_2O_3$), magnesia (MgO), silica ($SiO_2$), and titania ($TiO_2$); nitrides such as aluminum nitride and silicon nitride; metal hydroxides such as calcium hydroxide, magnesium hydroxide, and aluminum hydroxide; clay minerals such as mica, talc, boehmite, zeolite, appetite, and kaolin; and glass fibers. As such a heat-resistant filler, for example, alumina ($Al_2O_3$) or boehmite ($Al_2O_3.H_2O$) is more preferably used from the viewpoints of stable quality, low cost, and easy availability. The average particle size (D50) of the heat-resistant filler is, for example, about 0.1 μm to 5.0 μm and is preferably limited to a range of about 0.2 μm to 2.0 μm. The BET specific surface area may be used as an approximate reference of the specific surface area of the inorganic filler, and the value thereof is 2.8 $m^2/g$ to 100 $m^2/g$.

A ratio of the mass of the heat-resistant filler to the total mass of the HRL 54 is suitably about 50 mass % or more and is usually preferably about 85 mass % to 99.8 mass % (for example, 90 mass % to 99 mass %). In addition, as the binder of the HRL 54, for example, various polymer materials which are used for constituting the positive electrode 30 and the negative electrode 40 can be used. A ratio of the mass of the binder (when CMC-Ca is used as a binder, the total amount thereof) to the total mass of the HRL 54 is, for example, about 1 mass % to 10 mass % and is usually preferably about 1 mass % to 5 mass %.

In the embodiment of the invention, it is important to set the average thickness of the HRL to be 2 μm to 10 μm. The average thickness of the HRL is more preferably 3 μm or more and more preferably 4 μm or more. The amorphous carbon-coated graphite, which is used as the negative electrode active material of the nonaqueous electrolyte secondary battery according to the embodiment of the invention, is highly reactive and causes, for example, an increase in the leakage current of the negative electrode. When the average thickness of the HRL is 2 μm or more, small short-circuit is not likely to occur even after repeated charging and discharging, and the amount of the leakage current generated can be suppressed to be small. As a result, for example, after the shutdown of the battery due to generated heat, further heat generation is prevented by rapidly stopping the electrochemical reaction of the battery. The average thickness of the HRL is more preferably 9 μm or less and more preferably 8 μm or less. With such a configuration, the internal resistance ratio can be suppressed, and high input and output characteristics can be realized for a long period of time.

This separator 50 is not particularly limited but can be prepared by forming the HRL 54 on at least one surface (for example, a single surface or both surfaces) of the separator substrate 52, for example, in the following procedure. That is, first, the separator substrate 52 is prepared. Next, for example, materials constituting the HRL layer 54 and the opposite region Y thereof is prepared. Typically, various constituting materials of the HRL are dispersed in an appropriate solvent (for example, water) to prepare a paste. Specifically, a slurry A for forming the opposite region Y can be prepared, for example, by dispersing an inorganic filler, a binder, and CMC-Ca in water. CMC-Ca is hardly-soluble as described above and thus is insufficiently dispersed in water during the preparation of the slurry A. Therefore, for example, it is preferable that CMC-Ca is mixed with other materials such as CMC-Na in a dry state (dry powder state), and then the mixture is dispersed in a solvent. However, the invention is not limited to this configuration. A slurry B for forming a region (region Z) other than the opposite region Y can be manufactured with the same preparation method as that of the slurry A, except that the slurry B does not contain the CMC-Ca.

[Nonaqueous Electrolytic Solution]

As the nonaqueous electrolytic solution, typically, a solution in which a supporting electrolyte (for example, a lithium salt, a sodium salt, or a magnesium salt; in a lithium ion secondary battery, a lithium salt) is dissolved or dispersed in a nonaqueous solvent can be used. As the nonaqueous solvent, various organic solvents which can be used in an electrolytic solution of a general nonaqueous electrolyte secondary battery. For example, carbonates, ethers, esters, nitriles, sulfones, and lactones can be used without any limitation. Specific examples of the nonaqueous solvent include ethylene carbonate (EC), propylene carbonate (PC), diethyl carbonate (DEC), dimethyl carbonate (DMC), and ethyl methyl carbonate (EMC). Among these nonaqueous solvents, one kind can be used alone, or a mixed solvent of two or more kinds can be used. The supporting electrolyte can be selected among various supporting electrolytes which are used in a general nonaqueous electrolyte secondary battery. Specific examples of the supporting electrolyte include lithium salts such as $LiPF_6$, $LiBF_4$, $LiClO_4$, $LiAsF_6$, $Li(CF_3SO_2)_2N$, and $LiCF_3SO_3$. Among these supporting electrolytes, one kind can be used alone, or two or more kinds can be used in combination. It is preferable that the concentration of the supporting electrolyte in the nonaqueous electrolyte is adjusted to be in a range of 0.7 mol/L to 1.3 mol/L.

In addition, the nonaqueous electrolyte may further contain various additives as long as the characteristics of the nonaqueous electrolyte secondary battery according to the embodiment of the invention do not deteriorate. These additives are used as a film forming agent, an overcharge additive, and the like for one or two or more of the purposes including: the improvement of the input and output characteristics of the battery; the improvement of cycle characteristics; the improvement of an initial charge-discharge efficiency; and the improvement of safety. Examples of the additives include a film forming agent such as lithium bis(oxalato)borate (LiBOB), vinylene carbonate (VC), vinyl ethylene carbonate (VEC), or fluoroethylene carbonate (FEC); an overcharge additive formed of a compound which may produce gas during overcharge, such as biphenyl (BP) or cyclohexylbenzene (CHB); a surfactant; a dispersant; and a thickener. The concentrations of these additives in the nonaqueous electrolyte vary depending on the king of the additive. For example, the concentration of the film forming agent is usually 0.1 mol/L or less (typically, 0.005 mol/L to 0.05 mol/L), and the concentration of the overcharge additive is usually 6 mass % or less (typically, 0.5 mass % to 4 mass %).

[Nonaqueous Electrolyte Secondary Battery]

The nonaqueous electrolyte secondary battery 100 has a structure in which the battery case 10 accommodates the positive electrode 30, the negative electrode 40, the separator 50, and the nonaqueous electrolytic solution described above. Here, it is preferable that the positive electrode 30, the negative electrode 40, and the separator 50 have an elongated shape and constitute a wound electrode body 20 shown in FIG. 3. That is, it is preferable that the wound electrode body 20 having a flat shape is constructed using a method including: laminating the sheet-shaped positive electrode 30 and the sheet-shaped negative electrode 40 with the two elongated separators 50 interposed therebetween; winding this laminate in the longitudinal direction (wound with the width direction, perpendicular to the longitudinal direction, set as a winding axis); and squashing the obtained wound body from the side surface thereof.

During the lamination, the positive electrode 30 and the negative electrode 40 overlap each other after being shifted from each other in the width direction such that the positive electrode current collector exposure portion 33 of the positive electrode 30 and the negative electrode current collector exposure portion 43 of the negative electrode 40 protrude from opposite sides of the separator 50 in the width direction, respectively. As a result, the positive electrode current collector exposure portion 33 and the negative electrode current collector exposure portion 43 protrude to the outside from winding core portions (that is, the active material layers 34, 44 of the positive and negative electrodes are opposite each other) in a winding axial direction of the wound electrode body 20. Therefore, by joining a positive electrode terminal 60 (formed of, for example, aluminum) to the positive electrode current collector exposure portion 33 through a positive electrode current collector member 62, the positive electrode 30 of the wound electrode body 20 and the positive electrode terminal 60 are electrically connected to each other. Likewise, by joining a negative electrode terminal 70 (formed of, for example, nickel) to the negative electrode current collector exposure portion 43 through a negative electrode current collector member 72, the negative electrode 40 and the negative electrode terminal 70 are electrically connected to each other. The positive and negative electrode current collector members 62, 72, the positive and negative electrode terminals 60, 70, and the positive and negative electrode current collectors 32, 42 are joined to each other by, for example, ultrasonic welding or resistance welding.

The battery case 10 can be preferably formed of various materials, for example, metals such as aluminum and an alloy thereof and iron and an alloy thereof; resins such as polyamide; and laminated films. In an example of FIG. 3, the battery case 10 is formed of an aluminum alloy and has a square shape. This battery case 10 includes: a flat box-shaped (typically, a rectangular shape) case body (external case) 12 having an open upper end and a closed bottom; and a sealing lid 14 that covers the opening of the case body 12. In a top surface (that is, the sealing lid 14) of the battery case 10, the positive electrode terminal 60, which is electrically connected to the positive electrode 30 of the wound electrode body 20, and the negative electrode terminal 70, which is electrically connected to the negative electrode 40 of the wound electrode body 20, are provided. In addition, in the sealing lid 14, typically, an injection hole (not shown) is formed through which the nonaqueous electrolytic solution is inserted into the case body 12 that accommodates the wound electrode body 20. Further, as in the case of a lithium ion secondary battery of the related art, the sealing lid 14 may further include a safety valve 82 for discharging gas, produced from the inside of the battery case 10, to the outside of the battery case 10 during an abnormal situation of the battery. The wound electrode body 20 is accommodated in the case body 12 in a state of being fixed to the sealing lid 14. Next, the opening of the case body 12 is sealed with the sealing lid 14. As a result, the secondary battery 100 can be constructed. The sealing lid 14 and the case body 12 are joined to each other, for example, by welding.

In a preferred embodiment of the secondary battery 100 disclosed herein, a current interrupt device (CID) 80 is provided in the battery case 10 and operates when the internal pressure of the battery case 10 increases to a predetermined pressure. The CID 80 is not limited to a specific shape as long as it is configured to cut a conductive path (for example, a charging path) ranging from at least one electrode terminal to the electrode body 20 when the internal pressure of the battery case 10 increases. Typically, the CID 80 is provided between the positive electrode terminal 60 and the electrode body 20 and is configured to cut a conductive path ranging from the positive electrode terminal 60 to the electrode body 20 when the internal pressure of the battery case 10 increases.

The nonaqueous electrolyte secondary battery 100 disclosed herein can be used in various applications and, for example, may have superior battery characteristics (for example, input and output characteristics and cycle characteristics) and superior safety as compared to batteries of the related art. In addition, superior battery performance and high reliability (including safety during overcharge) can be simultaneously realized at a high level. Accordingly, using these characteristics, the nonaqueous electrolyte secondary battery 100 can be preferably used in applications in which high energy density and high input and output densities are required and in applications in which high reliability is required. Examples of the applications include driving power supplies mounted in vehicles such as a plug-in hybrid vehicle (PHV), a hybrid vehicle (HV), and an electric vehicle (EV). The above-described effects can be suitably obtained even when the plural secondary batteries are bound and used, and thus the use thereof in the bound state may also be a preferable form. Accordingly, this secondary battery may be used in the form of a battery pack in which, typically, plural secondary batteries are connected to each other in series and/or in parallel.

Hereinafter, as a specific example of the invention, the nonaqueous electrolyte secondary battery disclosed herein was manufactured. The invention is not intended to be limited to the specific example.

[Construction of Lithium Ion Battery for Evaluation]

Example 1

Positive Electrode $Li_{1.14}Ni_{0.34}Co_{0.33}Mn_{0.33}O_2$ (LNCM) as a positive electrode active material; acetylene black (AB) as a conductive material; and polyvinylidene fluoride (PVdF) as a binder were weighed at a weight ratio of 90:8:2. These weighed materials were mixed with N-methylpyrrolidone (NMP) to prepare a positive electrode paste. Both surfaces of an elongated aluminum foil having a thickness of 15 μm as a positive electrode current collector were coated with the positive electrode paste such that the width from an end portion in the longitudinal direction was 94 mm. The remaining region was left as a positive electrode current collector exposure portion, and the aluminum foil was dried and then rolled such that the total thickness of the positive electrode was 170 μm. As a result, a sheet-shaped positive electrode including the positive electrode active material layer on the positive electrode current collector was prepared. This sheet was cut into a positive electrode having a length of 4500 mm.

[Negative Electrode]

Graphite (C) as a negative electrode active material; a sodium salt of carboxymethyl cellulose (CMC; BSH-6) as a thickener; and styrene-butadiene rubber (SBR) as a binder were weighed at a weight ratio of 100:1:1. The weighed materials were mixed with ion exchange water to prepare a negative electrode paste. Both surfaces of an elongated copper foil having a thickness of 14 μm as a negative electrode current collector were coated with the negative electrode paste such that the width from an end portion in the longitudinal direction was 100 mm. The remaining region was left as a negative electrode current collector exposure portion, and the copper foil was dried and then rolled such that the total thickness of the negative electrode was 150 μm. As a result, a sheet-shaped negative electrode including the negative electrode active material layer on the negative electrode current collector was prepared. This sheet was cut into a negative electrode having a length of 4700 mm.

[Separator]

As a separator, an HRL-provided separator including an HRL on a single surface of a substrate was prepared. As the substrate, an elongated microporous sheet having a three-layer structure of PP/PE/PP with a width of 105 mm and an average total thickness of 25 μm was prepared. In addition, in the HRL, a region Y containing a CMC-Ca component and a region Z containing no CMC-Ca component were formed along the longitudinal direction of the substrate. The width of the region Y was adjusted such that the region Y was opposite to a region which occupied 25% of the positive electrode active material layer (region having a width which was 25% of the width of the positive electrode active material layer; region X) from the end portion adjacent to the exposure portion. For convenience of description, it was assumed that the region Y included a wide portion that was not opposite to the positive electrode active material layer. Hereinafter, this region Y will be referred to simply as "opposite region 25%". The regions Y and Z of the HRL were formed by coating the regions Y and Z of the separator substrate with a slurry A containing a CMC-Ca component and a slurry B containing no CMC-Ca component, respectively. The slurries A and B were prepared as follows. In addition, in order to coat the slurries, a gravure coater was used.

(Slurry A)

Alumina powder was used as a heat-resistant filler, two kinds of thickeners including a calcium salt (CMC-Ca) and a sodium salt (CMC-Na; BSH-6) of carboxymethyl cellulose were used as a thickener, and SBR was used as a binder. These materials were put into a disperser (CLEARMIX, manufactured by M Technique Co., Ltd.) such that the amount of CMC-Ca was 0.35 parts by mass, the amount of CMC-NA was 0.65 parts by mass, and the amount of SBR was 0.5 parts by mass with respect to 100 parts by mass of the alumina powder. These materials and ion exchange water were stirred in the disperser at a chiller temperature of 25° C. to prepare the slurry A for forming the HRL layer.

(Slurry B)

Alumina powder was used as a heat-resistant filler, a sodium salt (CMC-Na; BSH-6) of carboxymethyl cellulose alone was used as a thickener, and SBR was used as a binder. These materials were put into the disperser such that the amount of CMC-Na was 1 part by mass and the amount of SBR was 0.5 parts by mass with respect to 100 parts by mass of the alumina powder. These materials and ion exchange water were stirred in the disperser at a chiller temperature of 25° C. to prepare the slurry B for forming the HRL layer.

The positive electrode and the negative electrode prepared as above were wound so as to have an elliptical cross-section while overlapping each other with the separator interposed therebetween. At this time, the positive electrode and the negative electrode were arranged such that the positive electrode active material layer covered the negative electrode active material layer in the width direction and such that the positive electrode current collector exposure portion and the negative electrode current collector exposure portion protruded to different sides in the width direction. In addition, the separator was arranged such that the HRL was opposite to the positive electrode side to insulate the active material layers of the positive and negative electrodes and such that the region Y of the HRL was opposite to the region X of the positive electrode active material layer adjacent to the positive electrode current collector exposure portion. The wound body was pressed into a flat shape with a flat plate at a pressure of 4 kN/cm$^2$ at room temperature (25° C.) for 2 minutes. As a result, a wound electrode body was obtained.

Next, a positive electrode terminal and a negative electrode terminal were attached to a sealing lid of a battery case, and these terminals were respectively welded to the positive electrode current collector exposure portion and the negative electrode current collector exposure portion, protruding from the wound electrode body, through current collector terminals. The wound electrode body connected to the sealing lid was put into an aluminum square battery case body through an opening thereof, and the opening and the sealing lid were welded. As the battery case, a battery case in which a CID was provided on a conductive path on a positive electrode side was used.

As the nonaqueous electrolytic solution, a solution was used in which LiPF$_6$ as a supporting electrolyte was dissolved in a mixed solvent at a concentration of 1.0 mol/L, the mixed solvent containing ethylene carbonate (EC), dimethyl carbonate (DMC), and ethyl methyl carbonate (EMC) at a volume ratio (EC:DMC:EMC) of 3:4:3. In addition, CHB and BP as an overcharge additive were further dissolved in the mixed solvent at each concentration of 1.0 mass %. In addition, 125 g of the nonaqueous electrolytic solution was injected to the battery case through an injection hole provided in the lid. As a result, a lithium ion battery of Example 1 (theoretical capacity: 24.0 Ah) was constructed.

Example 2

A lithium ion battery was constructed in the same procedure as that of Example 1, except that the HRL of the separator was adjusted such that the region Y was opposite to the opposite region 0% (that is, the region Z alone was provided without providing the region Y).

Example 3

A lithium ion battery was constructed in the same procedure as that of Example 1, except that the HRL of the separator was adjusted such that the region Y was opposite to the opposite region 1%.

Example 4

A lithium ion battery was constructed in the same procedure as that of Example 1, except that the HRL of the separator was adjusted such that the region Y was opposite to the opposite region 2%.

Example 5

A lithium ion battery was constructed in the same procedure as that of Example 1, except that the HRL of the separator was adjusted such that the region Y was opposite to the opposite region 50%.

Example 6

A lithium ion battery was constructed in the same procedure as that of Example 1, except that the HRL of the separator was adjusted such that the region Y was opposite to the opposite region 60%.

Example 7

A lithium ion battery was constructed in the same procedure as that of Example 1, except that, in the slurry A, the mixing amount of CMC-Ca was changed to 0.15 parts by mass and the mixing amount of CMC-Na was changed to 0.85 parts by mass.

Example 8

A lithium ion battery was constructed in the same procedure as that of Example 1, except that, in the slurry A, the mixing amount of CMC-Ca was changed to 0.25 parts by mass and the mixing amount of CMC-Na was changed to 0.75 parts by mass.

Example 9

A lithium ion battery was constructed in the same procedure as that of Example 1, except that, in the slurry A, the mixing amount of CMC-Ca was changed to 0.5 parts by mass and the mixing amount of CMC-Na was changed to 0.5 parts by mass.

Example 10

A lithium ion battery was constructed in the same procedure as that of Example 1, except that, in the slurry A, the mixing amount of CMC-Ca was changed to 0.6 parts by mass and the mixing amount of CMC-Na was changed to 0.4 parts by mass.

[Measurement of Resistance]

Regarding the lithium ion battery for evaluation of each example prepared as above, the initial resistance was measured. That is, a conditioning treatment was performed on the lithium ion battery under appropriate conditions. Next, at a temperature of 25° C., the SOC (State of Charge) of each of the lithium ion batteries was adjusted to 60%, and the battery was discharged at a constant current and 10 C for 10 seconds. The initial resistance was obtained from a slope of a linear approximation line of a current (I)-voltage (V) plot value. Here, 1C refers to a current value at which the battery capacity (Ah) estimated from the theoretical capacity of the positive electrode can be charged in one hour. The resistance measurement was performed at 10 (N=10) batteries for each example, and the average value is shown in Table 1.

[Measurement of Capacity Retention after Cycles]

First, the initial capacity was measured in the following procedure. That is, at a temperature of 25° C., the battery of each example was charged to 4.1 V at a constant current (CC) and a rate of 1 C, and then the operation was stopped for 5 minutes. Then, the battery was discharged to 3.0 V at a constant current (CC) and a rate of 1 C, and then the operation was stopped for 5 minutes. Next, CCCV charging (4.1 V, rate: 1 C, 0.1 C-cut off) was performed, and the operation was stopped for 10 minutes. Then, CCCV discharging (3.0 V, rate: 1 C, 0.1 C-cut off) was performed. The discharge capacity at this time was measured and set as the initial capacity. Next, the capacity retention after cycles was measured in the following procedure. That is, after the measurement of the initial capacity, the battery was stabilized in a thermostatic chamber at 50° C., was CC-charged to 4.1 V at a rate of 2 C, and then was CC-discharged to 3.0 V at the same rate. This charging-discharging operation was set as one cycle, and 1000 cycles were performed. In the final cycle, the discharge capacity was measured and set as the capacity after the cycles. Based on these values, the capacity retention (%) before and after the charging-discharging cycles was calculated from the following equation.

(Capacity Retention(%) before and after Charging-Discharging Cycles)=(Capacity after Cycles)÷(Initial Capacity)×100

The results of capacity retentions of five (N=5) batteries were obtained, and the average value thereof is shown in Table 1.

[Measurement of Capacity Retention after Holding]

Regarding the battery of each example, first, the initial capacity was measured in the same procedure as described above, and the capacity retention after holding was measured in the following procedure. That is, after the measurement of the initial capacity, the SOC of the battery was adjusted to 100% at a temperature of 25° C. Next, the battery was held at 60° C. for 100 hours, and the capacity was measured in the same procedure as that in the measurement of the initial capacity and was set as the capacity after holding. Based on these values, the capacity retention (%) before and after holding at a high temperature was calculated from the following equation.

(Capacity Retention(%) before and after Holding at High Temperature)=(Capacity after Holding)÷(Initial Capacity)×100

The results of capacity retentions of 50 (N=50) batteries were obtained, and the average value thereof is shown in Table 1.

[Overcharge Test after Holding]

An overcharge test was performed on the battery of each example after the measurement of the capacity retention after holding. That is, after the measurement of the capacity retention after holding, the battery was overcharged to a charge upper limit voltage of 20 V at a constant current of 24 A (corresponding to 1 C) at a temperature of 25° C. Whether or not the CID was operated due to the overcharge was determined by measuring the voltage of the battery. This test was performed on 10 batteries for each example, and the number of batteries in which the CID was operated is shown in Table 1.

[Measurement of Capacity Retention at 0° C.]

Regarding the battery of each example, first, the initial capacity was measured in the same procedure as described above, and the capacity retention at 0° C. was measured in the following procedure. That is, after the measurement of the initial capacity, the SOC of the battery was adjusted to 50% at a temperature of 25° C. Next, the battery was stabilized at a temperature of 0° C., and pulse charging and discharging was performed in 50,000 cycles with the following steps (I) to (IV) as one cycle. Next, the capacity was measured in the same procedure as that in the measurement of the initial capacity and was set as the capacity after pulse charging and discharging at 0° C. Based on these values, the capacity retention (%) before and after the pulse charging and discharging at 0° C. was calculated from the following equation.

(Capacity Retention(%) before and after Pulse Charging and Discharging at 0° C.)=(Capacity after Charging and Discharging)÷(Initial Capacity)×100

The results of capacity retentions of 10 (N=10) batteries were obtained, and the average value thereof is shown in Table 1.

The steps (I) to (IV) included in one cycle of pulse charging and discharging were as follows.

(I) The battery was charged at a constant current and 20 C for 10 seconds.
(II) The operation was stopped for 10 seconds.
(III) The battery was discharged at a constant current and 20 C for 10 seconds.
(IV) The operation was stopped for 10 seconds.

TABLE 1

| Example | Opposite Region (%) | CMC-Ca (part(s) by mass) | Resistance (mΩ) | Capacity Retention (%) after Cycles | Capacity Retention (%) after Holding | Overcharge Test after Holding (Number) | Capacity Retention at 0° C. |
|---|---|---|---|---|---|---|---|
| 2 | 0 | 0.35 | 3.2 | 84.2 | 89.8 | 4 | 79.1 |
| 3 | 1 | 0.35 | 3.3 | 85.2 | 95.4 | 7 | 79.2 |
| 4 | 2 | 0.35 | 3.2 | 89.4 | 97.2 | 10 | 78.9 |
| 1 | 25 | 0.35 | 3.3 | 89.5 | 97.4 | 10 | 79.1 |

TABLE 1-continued

| Example | Opposite Region (%) | CMC-Ca (part(s) by mass) | Resistance (mΩ) | Capacity Retention (%) after Cycles | Capacity Retention (%) after Holding | Overcharge Test after Holding (Number) | Capacity Retention at 0° C. |
|---|---|---|---|---|---|---|---|
| 5 | 50 | 0.35 | 3.3 | 89.8 | 97.4 | 10 | 79.2 |
| 6 | 60 | 0.35 | 3.6 | 89.4 | 97.2 | 10 | 70.1 |
| 7 | 25 | 0.15 | 3.3 | 84.3 | 90.1 | 5 | 79.1 |
| 8 | 25 | 0.25 | 3.1 | 89.8 | 97.5 | 10 | 79.3 |
| 1 | 25 | 0.35 | 3.3 | 89.5 | 97.4 | 10 | 79.1 |
| 9 | 25 | 0.5 | 3.3 | 89.9 | 97.2 | 10 | 79.4 |
| 10 | 25 | 0.6 | 3.7 | 89.2 | 97.3 | 10 | 67.8 |

* For convenience of comparison, two columns are provided for Example 1.

In the battery of Example 2, the HRL opposite to the positive electrode contained CMC-Na alone without containing CMC-Ca. Example 2 may be regarded as a relative example of the invention. As clearly seen from Table 1, it was verified that, in the battery of Example 2, the cycle characteristics were lower than those of the other batteries. In particular, the capacity retention after cycles and the capacity retention after holding were low. In addition, even in the overcharge stage, the operation ratio of the CID was extremely low at 0.4. The reason is considered to be as follows: the HRL of the separator was collapsed due to the expansion and shrinkage of the active materials of the positive electrode and the negative electrode along with charging and discharging, and thus the nonaqueous electrolytic solution impregnated into the separator was discharged outside the separator. In addition, in the battery in which the HRL was collapsed as described above, even in the overcharge state, the overcharge additive in the nonaqueous electrolytic solution did not react with the positive electrode sufficiently, and a sufficient amount of gas for operating the CID was not produced.

On the other hand, in the batteries of Examples 1 and 3 to 10 in which CMC-Ca was contained in the HRL opposite to the region adjacent to the current collector exposure portion of the positive electrode active material layer, it was verified that the cycle characteristics were improved. Specifically, it was verified that the capacity retention after cycles and the capacity retention after holding were suitably improved. In addition, it was verified that, in the overcharge state, a sufficient amount gas was produced even after the holding, and the CID was rapidly operated.

When Examples 1 and 3 to 6 were compared to each other, the following points were found. In the region Y containing CMC-Ca, as the area of the positive electrode active material layer opposite to the region increased from the current collector exposure portion side, the effects tended to increase. In particular, when the region Y contained CMC-Ca until the region Y was opposite to the opposite region 2%, the effects thereof significantly increases. Further, it was verified that the effects gradually increased until the region Y was opposite to the opposite region 50%. However, when the region Y was opposite to the opposite region 60%, the battery characteristics were superior as compared to a case where the region Y did not contain CMC-Ca, but the resistance increased. Accordingly, in the battery according to the embodiment, it is considered that the following configuration is preferable: the region Y containing CMC-Ca is opposite to a region which is narrower than the opposite region 60% and preferably the opposite region 50% or narrower (for example, the opposite region 1% to 50%, preferably 2% to 50%, and more preferably 25% to 50%).

In addition, when Examples 1 and 7 to 10 were compared to each other, the following points were found. As the amount of CMC-Ca in the region Y increased, the effects thereof increased. When the amount of CMC-Ca increased to 0.25 parts by mass with respect to 100 parts by mass of the inorganic filler, the effects thereof significantly increased. Further, when the amount of CMC-Ca increased to 0.5 parts by mass, the effects thereof gradually increased. However, when the amount of CMC-Ca increased to 0.6 parts by mass, the battery characteristics were superior as compared to a case where the region Y did not contain CMC-Ca, but the resistance increased. Accordingly, in the battery according to the embodiment, it is considered that the following configuration is preferable: the amount of CMC-Ca in the region Y is suppressed to be less than 0.6 parts by mass (preferably 0.15 parts by mass to 0.5 parts by mass and more preferably 0.25 parts by mass to 0.5 parts by mass).

Hereinabove, the specific examples of the invention have been described in detail. However, these examples are merely exemplary. The invention includes various modifications and alternations of the above-described specific examples.

The invention claimed is:

1. A nonaqueous electrolyte secondary battery comprising:
   a positive electrode;
   a negative electrode;
   a separator that is arranged between the positive electrode and the negative electrode;
   a nonaqueous electrolytic solution; and
   a battery case that accommodates the positive electrode, the negative electrode, the separator, and the nonaqueous electrolytic solution, wherein
   the positive electrode includes a positive electrode current collector and a positive electrode active material layer,
   the positive electrode current collector has a positive electrode current collector exposure portion,
   the positive electrode current collector exposure portion is provided at an end portion of the positive electrode current collector,
   the positive electrode active material layer is formed on a portion of a surface of the positive electrode current collector other than the positive electrode current collector exposure portion,
   the separator includes a separator substrate and a heat resistance layer,
   the separator has an opposite surface opposite the positive electrode active material layer,
   the heat resistance layer constitutes at least a part of the opposite surface and contains a heat-resistant filler and a binder, the positive electrode active material layer has an adjacent region, the heat resistance layer has an opposite region opposite at least an end portion of the adjacent region, the end portion of the adjacent region being adjacent to the positive electrode current collector exposure portion, the opposite region contains at least a calcium salt of carboxymethyl cellulose, an end portion of the separator extends beyond the end portion of the adjacent region, the heat resistance layer consists of the opposite region and a non-opposite region, and the non-opposite region is not opposite to the adjacent region and does not contain a calcium salt of carboxymethyl cellulose.

2. The nonaqueous electrolyte secondary battery according to claim 1, wherein the battery case includes a pressure-sensitive current interrupt device, and the nonaqueous electrolytic solution contains an overcharge additive that produces gas in an overcharge state of the nonaqueous electrolyte secondary battery.

3. The nonaqueous electrolyte secondary battery according to claim 1, wherein the opposite surface includes an opposite portion, an entire surface of the opposite portion is opposite to the positive electrode active material layer, and the opposite region occupies 1% or more to 50% or less of the opposite portion.

4. The nonaqueous electrolyte secondary battery according to claim 3, wherein the opposite region occupies 40% or less of the opposite portion.

5. The nonaqueous electrolyte secondary battery according to claim 4, wherein the opposite region occupies 30% or less of the opposite portion.

6. The nonaqueous electrolyte secondary battery according to claim 5, wherein the opposite region occupies 25% or less of the opposite portion.

7. The nonaqueous electrolyte secondary battery according to claim 3, wherein the opposite region occupies 2% or more of the opposite portion.

8. The nonaqueous electrolyte secondary battery according to claim 7, wherein the opposite region occupies 5% or more of the opposite portion.

9. The nonaqueous electrolyte secondary battery according to claim 8, wherein the opposite region occupies 10% or more of the opposite portion.

10. The nonaqueous electrolyte secondary battery according to claim 1, wherein the opposite region includes an end portion of the separator.

11. The nonaqueous electrolyte secondary battery according to claim 1, wherein the opposite region contains the calcium salt of carboxymethyl cellulose at a ratio of 0.25 parts by mass or more to 0.5 parts by mass or less with respect to 100 parts by mass of the heat-resistant filler.

12. The nonaqueous electrolyte secondary battery according to claim 1, wherein the positive electrode, the negative electrode, and the separator have an elongated shape and constitute a wound electrode body.

* * * * *